(12) United States Patent
Shirai (10) Patent No.: US 7,722,069 B2
(45) Date of Patent: May 25, 2010

(54) BICYCLE SUSPENSION SYSTEM

(75) Inventor: Toyoto Shirai, Osaka (JP)

(73) Assignee: Shimano Inc., Osaka (JP)

( * ) Notice: Subject to any disclaimer, the term of this patent is extended or adjusted under 35 U.S.C. 154(b) by 197 days.

(21) Appl. No.: 12/134,428

(22) Filed: Jun. 6, 2008

(65) Prior Publication Data
US 2009/0302558 A1     Dec. 10, 2009

(51) Int. Cl.
*B62K 21/02*     (2006.01)
*F16F 9/34*      (2006.01)

(52) U.S. Cl. .................. 280/276; 280/279; 188/300; 188/299.1; 188/282.2; 188/284; 188/285

(58) Field of Classification Search ............... 280/276, 280/279; 188/300, 299.1, 282.2, 284, 285
See application file for complete search history.

(56) References Cited

U.S. PATENT DOCUMENTS

| | | | |
|---|---|---|---|
| 6,105,988 A | 8/2000 | Turner et al. | |
| 6,120,049 A * | 9/2000 | Gonzalez et al. | 280/276 |
| 6,217,049 B1 * | 4/2001 | Becker | 280/276 |
| 6,360,857 B1 * | 3/2002 | Fox et al. | 188/281 |
| 6,360,858 B2 | 3/2002 | Gonzalez et al. | |
| 6,592,136 B2 | 7/2003 | Becker et al. | |
| 7,147,207 B2 | 12/2006 | Jordan et al. | |
| 7,163,223 B2 | 1/2007 | Wesling et al. | |
| 7,325,661 B2 * | 2/2008 | Chen | 188/300 |

\* cited by examiner

*Primary Examiner*—Lesley Morris
*Assistant Examiner*—Marlon A Arce
(74) *Attorney, Agent, or Firm*—Global IP Counselors, LLP (57) ABSTRACT

A bicycle suspension system is provided with a damping unit and a damping control unit to control movement of upper and lower telescopically connected tubes. A damping force adjustment valve selectively adjusts a fluid flow rate of fluid passed a damping piston. The damping piston has a fluid flow port that is axially spaced with respect to a fluid flow passage of a damping lockout mechanism such that a flow path is formed in an axial direction by the fluid flow port of the damping piston and the fluid flow passage of the damping lockout mechanism when the damping lockout mechanism is in a non-lockout mode. A first actuating member operates the damping force adjustment valve and a second actuating member operates the damping lockout mechanism such that the damping force adjustment valve remains in a set position when the second actuating member is being operated.

16 Claims, 11 Drawing Sheets

BICYCLE SUSPENSION SYSTEM

BACKGROUND OF THE INVENTION

1. Field of the Invention

This invention generally relates to a bicycle suspension system. More specifically, the present invention relates to a bicycle suspension system having a damping force adjustment and a suspension lockout.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. In the past, most bicycles had rigid frames and forks which typically transmitted the shocks resulting from rough riding surfaces directly to the rider. In other words, most bicycles were not provided with any front or rear suspension. Recently, bicycles, especially mountain bikes (MTB) and all terrain bikes (ATB), were introduced that included front suspension forks to absorb the shocks transmitted to the rider when riding on a rough road. This made riding on rough terrain easier and less physically stressful.

The first suspension forks had about 1½ to 2 inches (38 to 50 mm) of suspension travel. Forks are now available with about 4 to 6 inches (100 to 150 mm) of suspension travel or more. Bicycles with front suspension and rigid, non-suspended rear wheels, or hardtails became popular nearly overnight. On most mountain bicycles, the front fork contains a set of shock absorbers. The suspension travel and handling characteristics vary depending on the type of mountain biking the fork is designed for. For instance, bicycle manufacturers produce different forks for cross-country (XC), downhill and freeride riding.

The shock absorber usually includes a spring and a damper or dashpot. The spring may be implemented with a steel or titanium coil, an elastomer, or even compressed air. The damper is usually implemented by forcing oil to pass through one or more small openings or shim stacks. On some bicycles, the spring, the damper, or both may be adjusted for rider weight, riding style, terrain, or any combination of these or other factors. Also, the two components are sometimes separated with the spring mechanism being in one leg and the damper being in the other leg.

In these bicycles with front suspension forks, it is sometimes desirable to be able to quickly adjust or lockout the suspension as needed and/or desired. Thus, there have been proposals to provide suspensions that include the ability to lockout the fork to completely eliminate or drastically reduce the fork's travel for more efficient riding over smooth sections of terrain.

SUMMARY OF THE INVENTION

One object of the present invention is to provide a bicycle suspension system in which the suspension can be locked out and unlocked without changing the damping rate setting of the damping unit.

Another object of the present invention is to provide a bicycle suspension system with a damping lockout mechanism in which an axial compression flow path is formed in an axial direction by a fluid flow port of the damping piston and a fluid flow passage of the damping lockout mechanism when the damping lockout mechanism is in a non-lockout mode.

The foregoing objects can basically be attained by providing a bicycle suspension system that comprises an upper tube, a lower tube, a damping unit and a damping control unit. The upper tube includes a top portion and a bottom portion. The lower tube includes a top portion and a bottom portion. The bottom portion of the lower tube is telescopically mounted with respect to the top portion of the upper tube to form an internal area of the upper and lower tubes. The damping unit is disposed within the internal area of the upper and lower tubes. The damping unit includes a damping piston defining an upper internal chamber and a lower internal chamber, a damping force adjustment valve which selectively adjusts a fluid flow rate of fluid passed the damping piston, and a damping lockout mechanism axially arranged with respect to the damping piston to selectively prevent fluid flowing through the damping piston. The damping piston has a fluid flow port that is axially spaced with respect to a fluid flow passage of the damping lockout mechanism such that an axial compression flow path is formed in an axial direction of the internal area by the fluid flow port of the damping piston and the fluid flow passage of the damping lockout mechanism when the damping lockout mechanism is in a non-lockout mode. The damping control unit includes a first actuating member operatively coupled to the damping force adjustment valve and a second actuating member operatively coupled to the damping lockout mechanism. The first and second actuating members are independently operable such that the damping force adjustment valve remains in a set position when the second actuating member is being operated.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
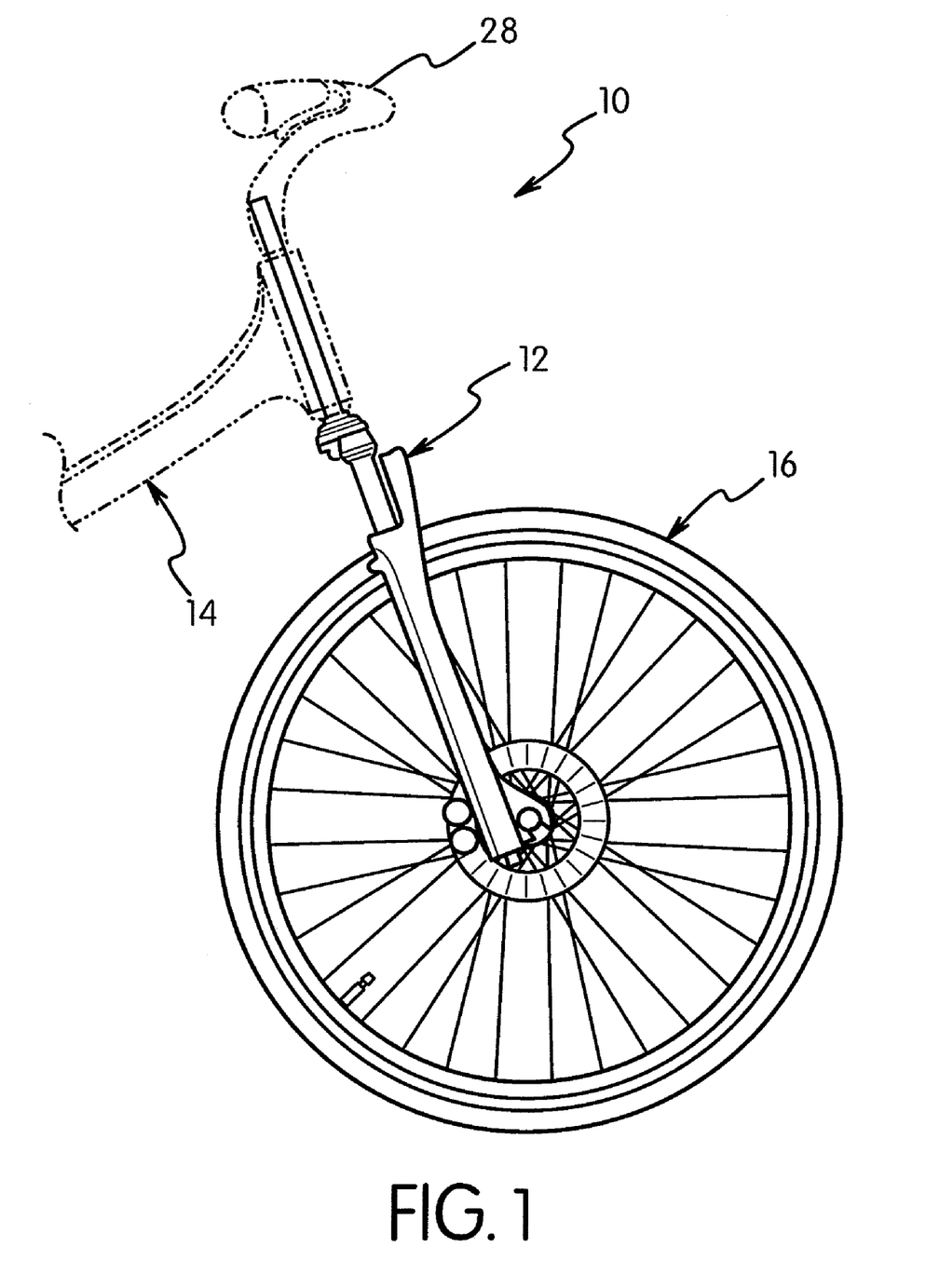
FIG. 1 is a side elevational view of a front portion of a bicycle equipped with a front suspension fork in accordance with one embodiment.

Referring initially to FIG. 1, a front end of a bicycle 10 is illustrated that is equipped with a front suspension fork 12 in accordance with a first embodiment. Basically, the front suspension fork 12 has an upper end that is rotatably mounted to a front part (head tube) of a bicycle frame 14 in a conventional manner, and a lower end that rotatably supports a front wheel 16. The rest of the bicycle 10 can be any type of bicycle, and thus, the bicycle 10 will not be discussed or illustrated in further detail herein.

Figure 2:
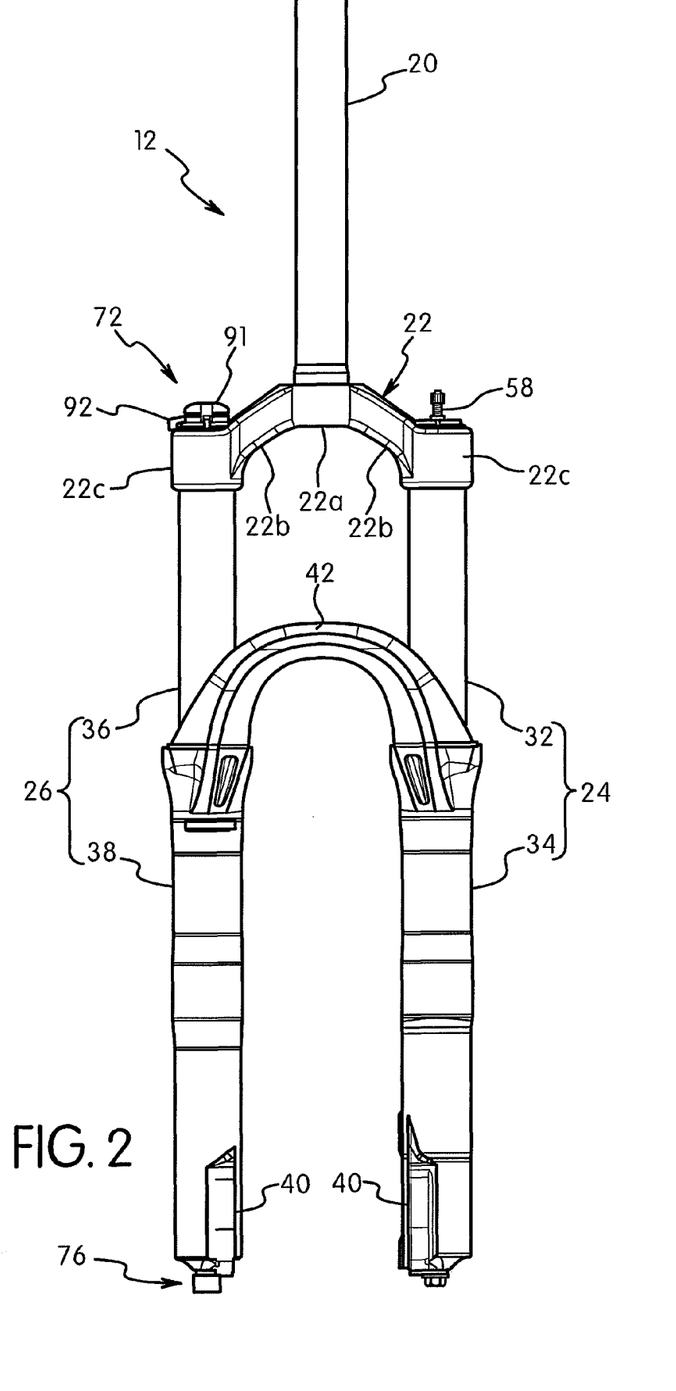
FIG. 2 is a front elevational view of the front suspension fork illustrated in FIG. 1.

As seen in FIG. 2, the front suspension fork 12 basically includes a steerer tube 20, a crown 22, a first or left leg 24 and a second or right leg 26. The first or left leg 24 constitutes a first or right suspension assembly, while the second or right leg 26 constitutes a second or left suspension assembly. The crown 22 is secured to a bottom end of the steerer tube 20. The legs 24 and 26 are secured at opposite lateral end of the crown 22. Typically, a handlebar 28 is fixedly mounted to the steerer tube 20 at its upper end for steering the front wheel 16 as seen in FIG. 1. Thus, the steerer tube 20 provides a means for connection of the handlebar 28 to the front suspension fork 12.

The steerer tube 20 includes, for example, a metal pipe member. The steerer tube 20 is rotatably supported by the head tube of the frame 14. The top end of the steerer tube 20 is fixed to the handlebar 28. The bottom end of the steerer tube 20 is inserted in the center of the crown 22, and is secured therein using an appropriate means such as press fitting, screw fitting or welding.

The crown 22 constitutes a fork shoulder unit that includes, for example, a metal molded member. The crown 22 has a cylindrical column securing portion 22a at its center for mounting the steerer tube 20. The crown 22 also has a pair of arms 22b that extend laterally from the column securing portion 22a while curving downward. The free ends of the arms 22b have cylindrical suspension mounting portions 22c for clamping the upper ends of the legs 24 and 26, respectively.

The left leg 24 includes a left upper tube 32 telescopically received in a left lower tube 34. In other words, the upper tube 32 includes a top portion and a bottom portion, with the bottom portion of the upper tube 32 being telescopically disposed within a top portion of the lower tube 34 such that the upper tube 32 is telescopically movable with respect to the lower tube 34. The hollow interiors of the upper and lower tubes 32 and 34 form an internal area of the upper and lower tubes 32 and 34 that changes in area when the upper and lower tubes 32 and 34 are moved together (compression) or moved apart (expansion or rebound).

Similarly, the right leg 26 includes a right upper tube 36 telescopically received in a right lower tube 38. In other words, the upper tube 36 includes a top portion and a bottom portion, with the bottom portion of the upper tube 36 being telescopically disposed within a top portion of the lower tube 38 such that the upper tube 36 is telescopically movable with respect to the lower tube 38. The hollow interiors of the upper and lower tubes 36 and 38 form an internal area of the upper and lower tubes 36 and 38 that changes in area when the upper and lower tubes 36 and 38 are moved together (compression) or moved apart (expansion or rebound).

The crown 22 connects the right upper tube 32 to the left upper tube 36 thereby connecting the left leg 24 to the right leg 26 of the suspension fork 12. Each of the lower tubes 34 and 38 includes a drop out 40 for connecting the front wheel 16 to the fork 12. An arch 42 connects the left lower tube 34 and the right lower tube 38 to provide strength and minimize twisting thereof. Preferably, the left lower tube 34, the right lower tube 38 and the arch 42 are formed as a unitary piece. However, the left lower tube 34, the right lower tube 38 and the arch 42 can be separate pieces and connected by a suitable fastening method.

The suspension fork 12 can also be provided with other conventional features. For example, disc brake bosses (not shown) can be provided on one or both of the lower tubes 34 and 38, as needed and/or desired, for mounting a disc brake caliper. Of course, it will be apparent to those skilled in the art from this disclosure that the suspension fork 12 can be configured to mount other types of braking systems as needed and/or desired.

Figure 3:
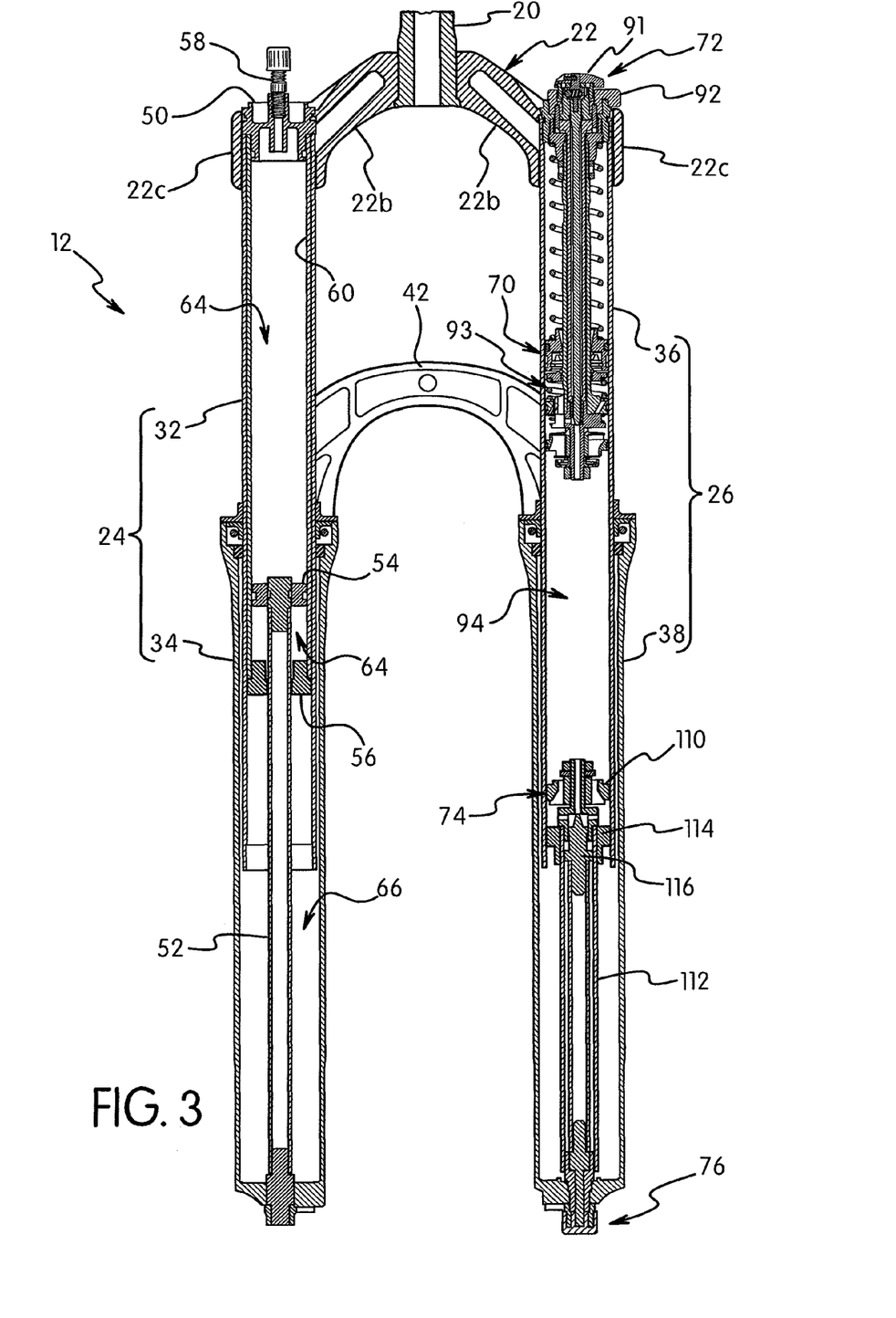
FIG. 3 is a longitudinal cross sectional view of the front suspension fork illustrated in FIGS. 1 and 2.

Referring now to FIG. 3, a longitudinal cross sectional view of the front suspension fork 12 is illustrated to show various internal components of the front suspension fork 12. As previously mentioned, the upper tubes 32 and 36 are capable of telescopic motion relative to the lower tubes 34 and 38, respectively. Each of the lower tubes 34 and 38 has a closed lower end and an open upper end. The lower ends of the upper tubes 32 and 36 are received into the open upper ends of the lower tubes 34 and 38, respectively. Each of the fork legs 24 and 26 preferably includes a sealing/bushing arrangement positioned between the respective upper tubes 32 and 36 and the lower tubes 34 and 38 at the location where the upper tubes 32 and 36 enter the open end of the lower tubes 34 and 38 in a conventional manner.

Basically, the left leg 24 constitutes an air-spring mechanism, while the right leg 26 constitutes a damping mechanism. The air-spring mechanism provides resistance to compression of the suspension fork 12 and releases energy stored during compression to cause the suspension fork 12 to extend, or rebound. The damping mechanism provides a damping force which resists both compression and rebound motion, to slow the motion of the suspension fork 12 in either direction.

Still referring to FIG. 3, the air-spring mechanism formed within the left leg 24 basically includes a cap 50, a piston rod 52, a first or upper piston 54 and a second or lower piston 56. The cap 50 closes the upper end of the left upper tube 32 to provide a preferably air and fluid-tight seal between the cap 50 and the inner surface of the left upper tube 32. The cap 50 preferably includes an air fill valve 58 provide pressurized air into the left leg 24 to form an air spring. Since the top portion of the lower tube 34 is telescopically movable with the bottom portion of the upper tube 32, an adjustable internal area is formed within the upper and lower tubes 32 and 34.

The piston rod 52 is a rigid rod that supports the upper piston 54 within the upper tube 32 and slidably engages the lower piston 56. In particular, the lower end of the piston rod 52 is fixed to the bottom end of the lower tube 34, while the upper piston 54 is fixed to the upper end of the piston rod 52. In other words, the piston rod 52 extends vertically upward from the closed bottom end of the lower tube 38 and supports the upper piston 54. The lower piston 56 is held at an intermediate axial point of the upper tube 32 by an inner sleeve 60. The inner sleeve 60 is coaxially disposed within the upper tube 32, with its upper end fixed to the cap 50 and the lower piston 56 fixed to its lower end. Thus, the lower piston 56 is fixed for movement with the upper tube 32 and the upper piston 54 is fixed for movement with the lower tube 34. The upper piston 54 is in sliding engagement with the inner sleeve 60, while the lower piston 56 is in sliding engagement with the piston rod 52.

The upper and lower pistons 54 and 56 divides the adjustable internal area of the left leg 24 into a first or positive air spring chamber 62, a second or negative air spring chamber 64 and a third air chamber 66. An annular seal or O-ring is disposed between the upper piston 54 and the inner surface of the inner sleeve 60 to create a seal therebetween. An annular seal or O-ring is also disposed between the lower piston 56 and the outer surface of the piston rod 52 to create a seal therebetween. The air fill valve 58 allows communication with the positive air spring chamber 62. A standard high pressure pump can be attached to the air fill valve 58 to pressurize the positive air spring chamber 62. Thus, when pressurized, the positive air spring chamber 62 acts as a suspension spring that exerts an extension force on the suspension fork 12. The third air chamber 66 is not an air-tight space.

When the upper and lower tubes 32 and 34 are compressed together, the air within the positive air spring chamber 62 of the left leg 24 compresses, while the air within the negative air spring chamber 64 of the left leg 24 expands. Thus, the air spring works by utilizing the characteristic of compressed air to resist further compression. Since the "spring" of the suspension fork 12 is provided by the compressed air rather than a coil of metal the suspension can be made lighter. Also with this type of fork design, the spring rate can easily be adjusted by adjusting the pressure of the air in the spring. This allows the fork 12 to be effectively tuned to a rider's weight.

Still referring to FIG. 3, the damping mechanism formed within the right leg 26 basically includes basically includes an upper damping unit 70, an upper damping control unit 72, a lower damping unit 74 and a lower damping control unit 76. The upper damping unit 70 and the upper damping control unit 72 form an upper damping assembly, while the lower damping unit 74 and the lower damping control unit 76 form a lower damping assembly. The upper damping control unit 72 is disposed on the top end of the upper tube 36 with the upper damping unit 70 disposed within the top portion of the upper tube 36. The lower damping control unit 76 is disposed on the bottom end of the lower tube 38 with the lower damping unit 74 disposed within the bottom portion of the upper tube 36.

Figure 4:
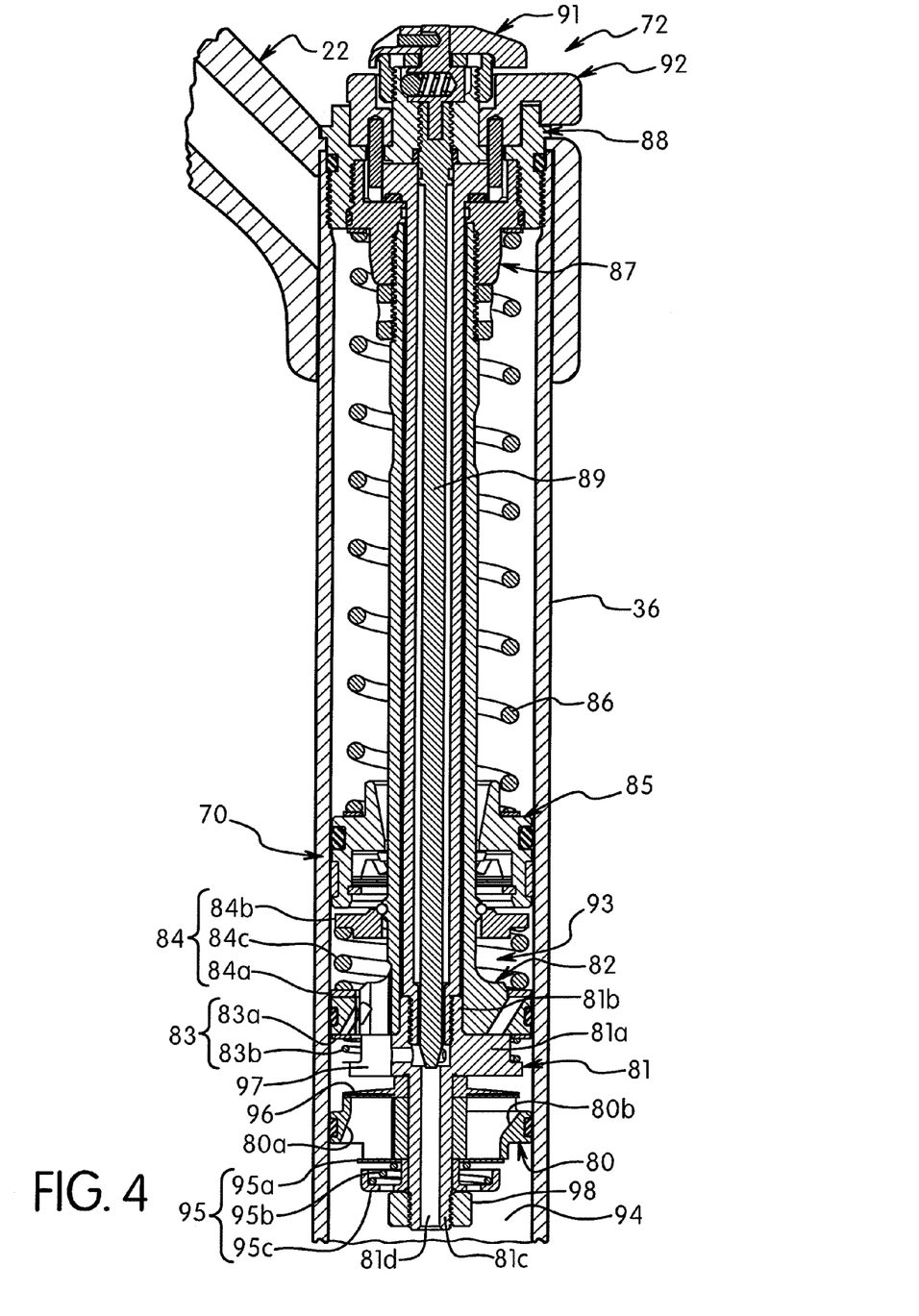
FIG. 4 is an enlarged, longitudinal cross sectional view of a top portion of the front suspension fork illustrated in FIGS. 1 to 3.
Figure 5:
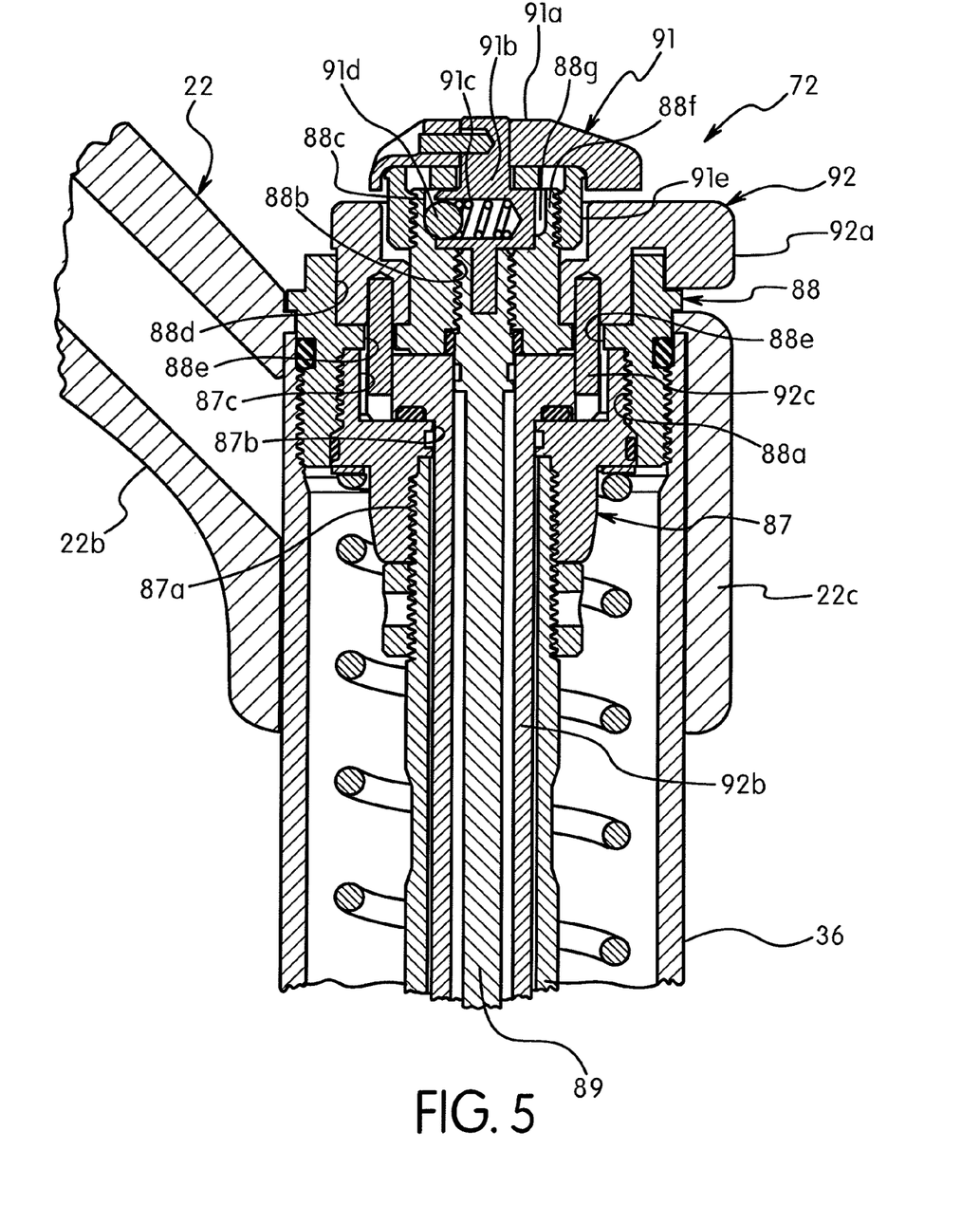
FIG. 5 is an enlarged, longitudinal cross sectional view of the damping control unit of the front suspension fork illustrated in FIGS. 1 to 4, with the damping unit in the normal operating mode.

Referring now to FIG. 4, the upper damping unit 70 basically includes a damping piston 80, a lockout valve 81, a lockout piston 82, a return valve 83, a blow-off mechanism 84, a free piston 85, a compression spring 86, an upper support member 87, an upper body member 88 and a damping force adjustment valve 89. The lockout valve 81 and the lockout piston 82 cooperate together to form a damping lockout mechanism that effectively locks the suspension fork 12 so that the suspension fork 12 functions as a rigid non-suspension fork, when in a lockout mode.

The upper damping control unit 72 is positioned at the top portion of the upper tube 36 and operatively coupled to the lockout valve 81 and the damping force adjustment valve 89. In particular, the upper damping control unit 72 basically includes a first actuating member 91 and a second actuating member 92. The first actuating member 91 is operatively coupled to the damping force adjustment valve 89 to adjust the damping force of the upper damping unit 70. The second actuating member 92 is operatively coupled to the lockout valve 81.

Figure 8:
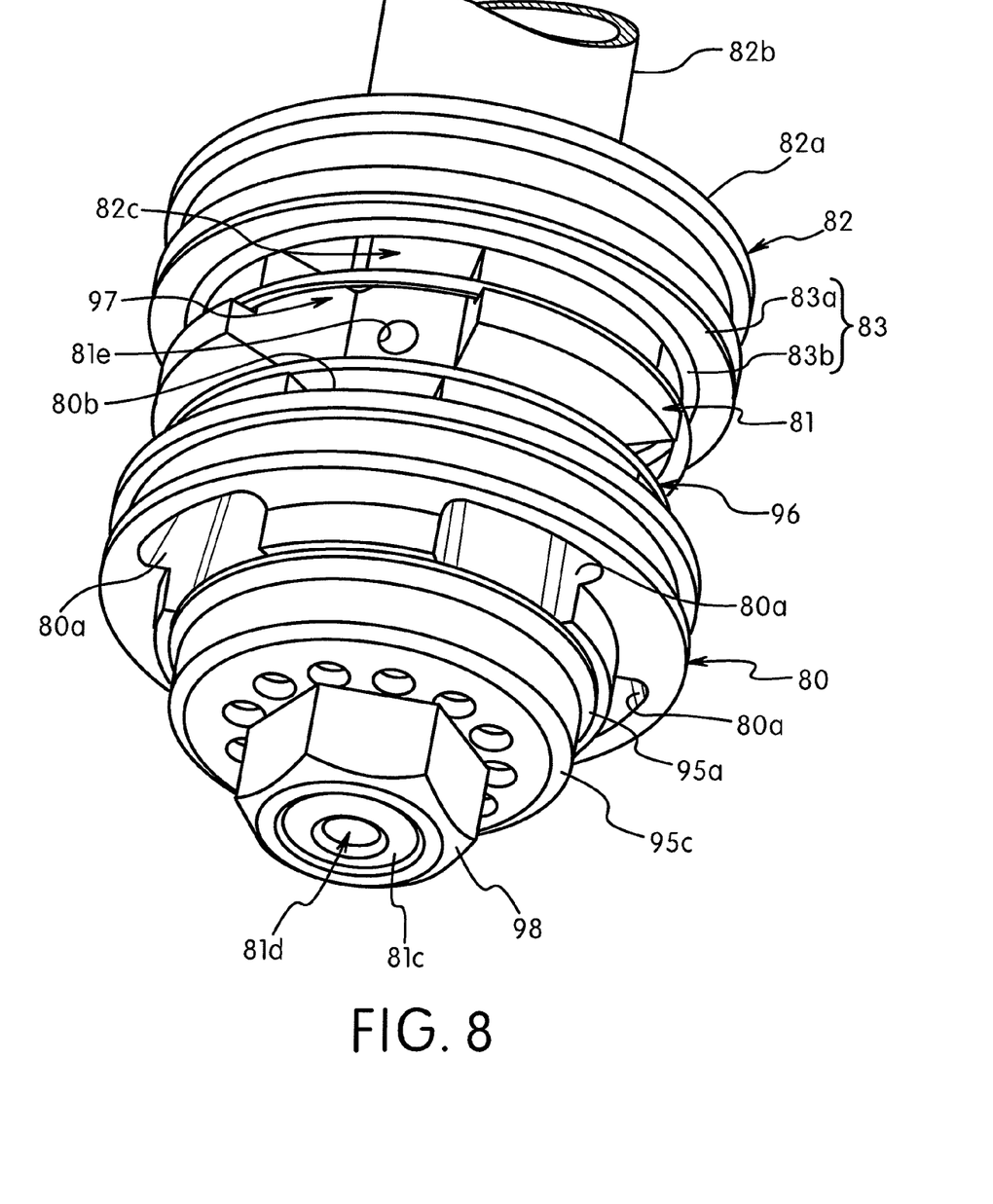
FIG. 8 is a bottom perspective view of the damping unit of illustrated in FIGS. 3 to 7 with the damping unit in a normal operating (non-lockout) mode.
Figure 11:
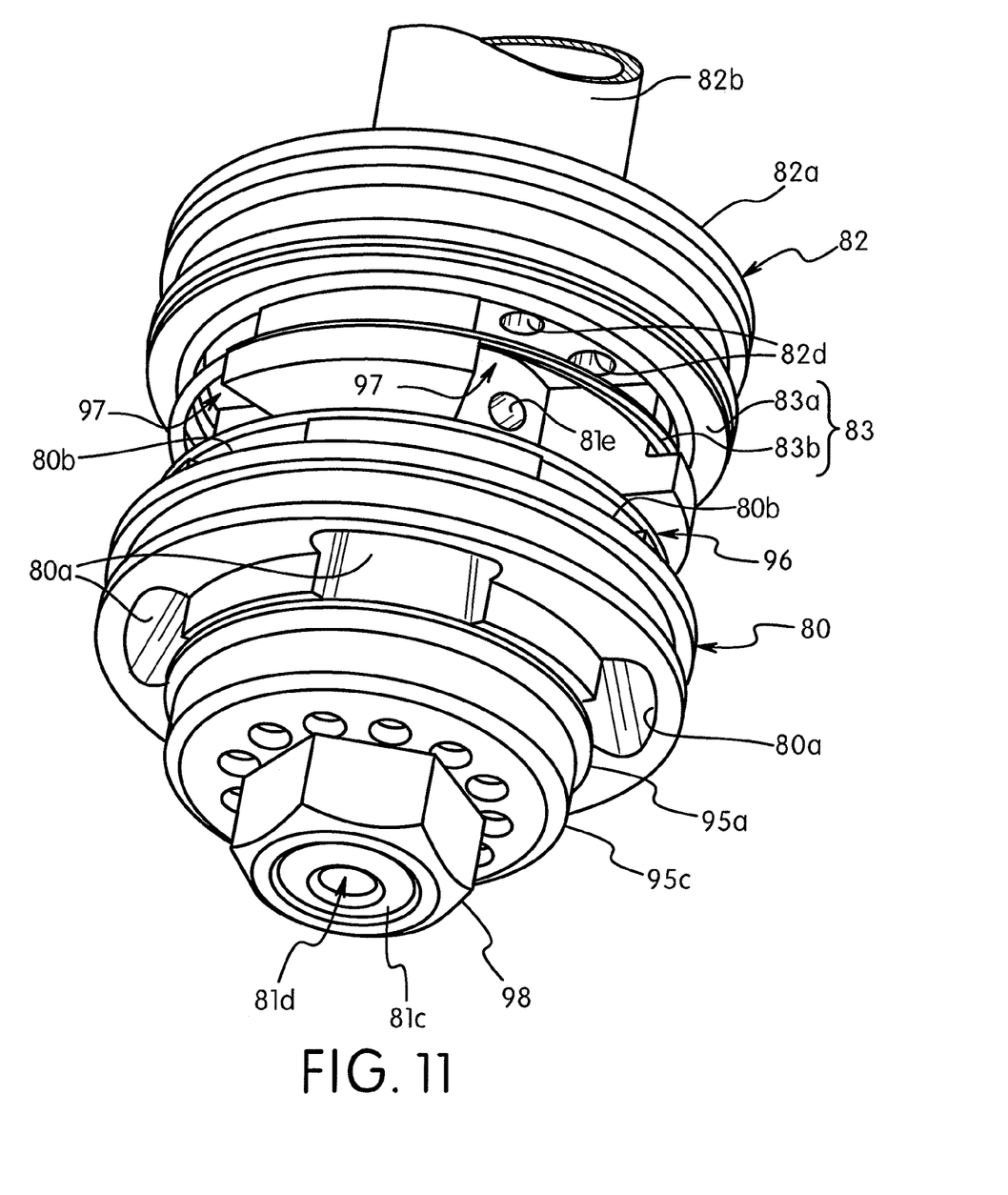
FIG. 11 is a bottom perspective view of the damping unit of illustrated in FIGS. 3 to 10 with the damping unit in the lockout mode.

The damping piston 80 basically divides the upper tube 36 into two areas so as to define an upper internal chamber 93 and a lower internal chamber 94. In particular, the damping piston 80 has an annular seal or O-ring disposed between its outer peripheral surface and the internal surface of the upper tube 36 to create a seal therebetween. The damping piston 80 preferably includes a plurality of rebound ports 80a and a plurality of compression ports 80b. The rebound ports 80a and the compression ports 80b are alternately arranged in a circumferential manner around the damping piston 80 as best seen in FIGS. 8 and 11. Preferably, the damping piston 80 is provided with a check valve 95 and a shim stack valve 96.

The check valve 95 basically includes a check valve plate 95a, a compression spring 95b and a spring retainer 95c. The check valve plate 95a is pressed against the lower end of the damping piston 80 by the compression spring 95b to normal close off the rebound ports 80a. However, during rebound of the suspension fork 12, the fluid in the right leg 26 forces the check valve plate 95a away from the lower end of the damping piston 80 to open the rebound ports 80a to allow the fluid to flow therethrough. Thus, the check valve 95 selectively allows fluid communication between the upper internal chamber 93 and the lower internal chamber 94 through the rebound ports 80a during rebound.

The shim stack valve 96 is normally pressed against the upper end of the damping piston 80 to normal close off the compression ports 80b. The shim stack valve 96 can a single shim, or a stack comprised of multiple shims, which are substantially annular in shape and made from a flexible spring steel, as is known in the art. The shim stack valve 96 selectively allows fluid communication between the upper internal chamber 93 and the lower internal chamber 94 through the compression ports 80b. During compression of the suspension fork 12, the shim stack valve 96 acts as a diaphragm spring and flexes in response to a sufficient force of fluid pressure in the lower internal chamber 94 to allow fluid flow through the compression ports 80b and into the upper internal chamber 93. During rebound of the suspension fork 12, the shim stack valve 96 is engaged with the upper surface of the damping piston 80 to prevent fluid from flowing through the shim stack valve 96. However, as mentioned above, the check valve 95 allows fluid communication between the upper internal chamber 93 and the lower internal chamber 94 through the rebound ports 80a during rebound.

The lockout valve 81 is rotatably mounted within the upper tube 36 with its outer peripheral surface spaced inwardly from the internal surface of the upper tube 36. Generally speaking, the lockout valve 81 is rotatable between a lockout position corresponding to a non-damping or lockout mode and an unlocked position corresponding to a normal damping or operating mode. By rotating the lockout valve 81 to the lockout position, fluid flow through the lockout piston 82 between the upper lower internal chambers 93 and 94 is effectively blocked. When the lockout valve 81 is in the unlocked position, fluid flows through the lockout piston 82 between the upper lower internal chambers 93 and 94 so that the suspension fork 12 can operate in its normal operating mode to absorb shocks from rough terrain.

Figure 6:
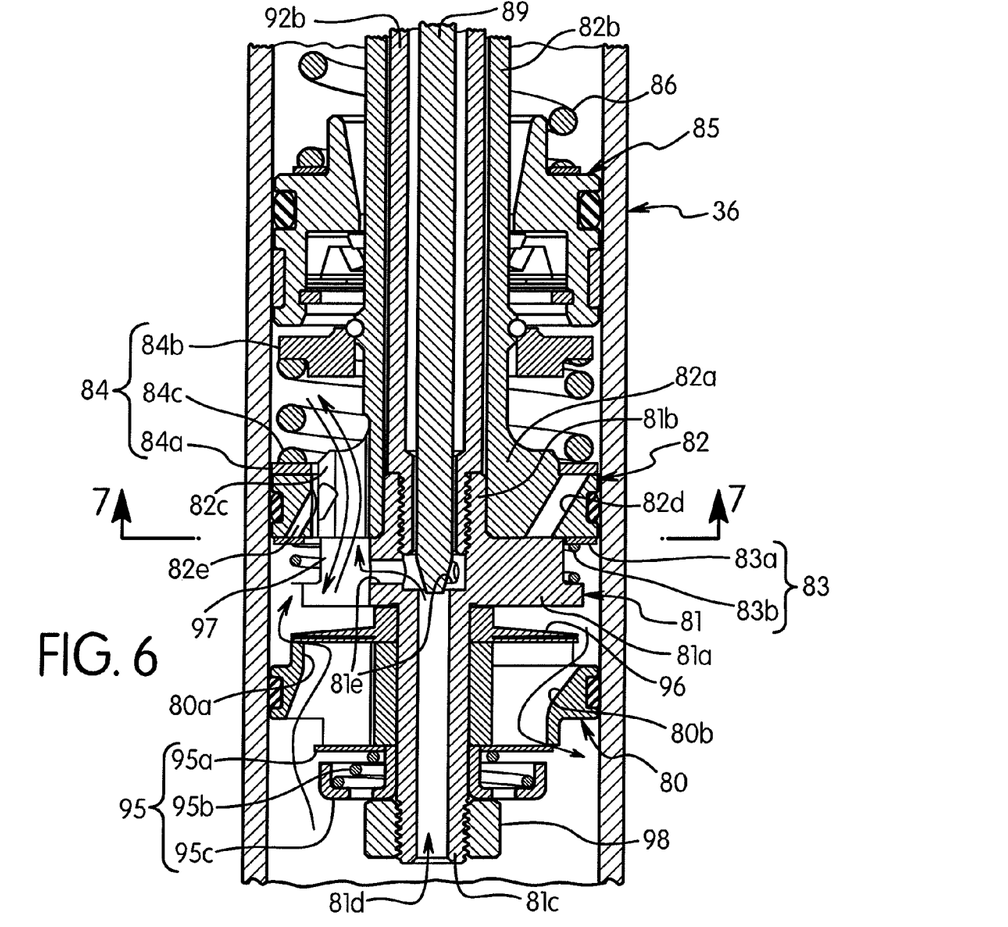
FIG. 6 is an enlarged, longitudinal cross sectional view of the damping unit of the front suspension fork illustrated in FIGS. 1 to 5, with the damping unit in the normal operating mode.
Figure 7:
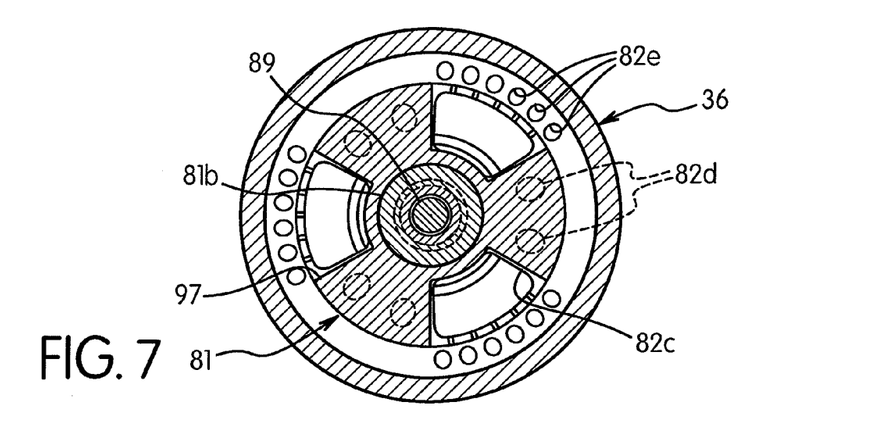
FIG. 7 is a transverse cross sectional view of the damping unit of the front suspension fork as seen along section line 7-7 of FIG. 6, with the damping unit in the normal operating (non-lockout) mode.
Figure 9:
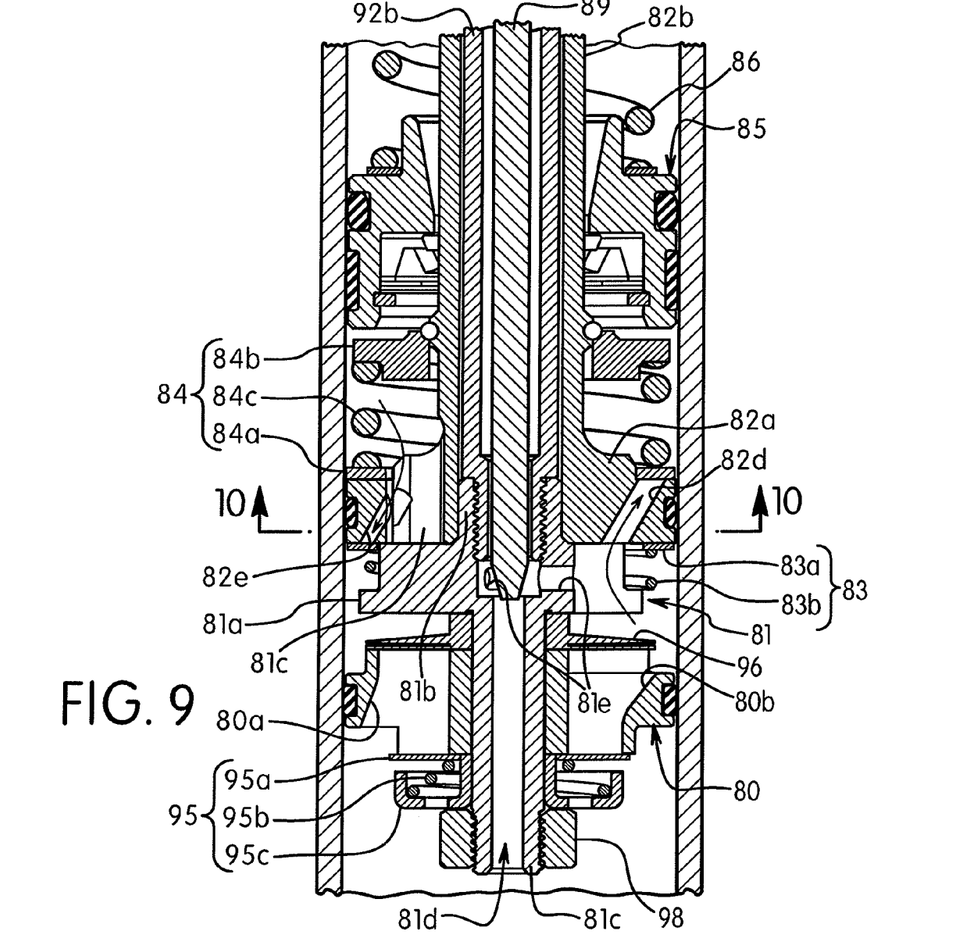
FIG. 9 is an enlarged, longitudinal cross sectional view of the damping unit illustrated in FIGS. 3 to 8, but with the damping unit in a lockout mode.
Figure 10:
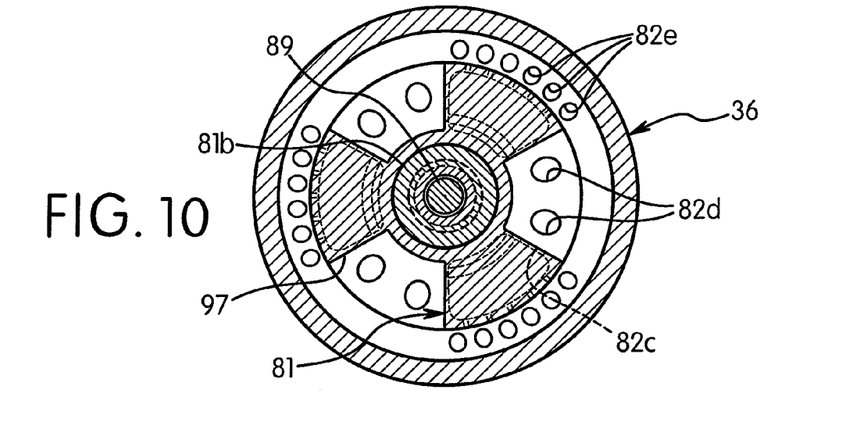
FIG. 10 is a transverse cross sectional view of the damping unit of the front suspension fork as seen along section line 10-10 of FIG. 9, with the damping unit in the lockout mode.

As seen in FIGS. 6 and 9, the lockout valve 81 basically includes a main body portion 81a, an upper shaft portion 81b and a lower shaft portion 81c. A center bore 81d extends axially through the portions 81a to 81c so that fluid can flow therethrough. As seen in FIGS. 7 and 10, the main body portion 81a has three lobe sections that are equally spaced apart in the circumferential direction to define three axial fluid flow passages 97. Three radial bores 81e extend radially from the center bore 81d to the axial fluid flow passages 97 so that fluid can flow from the center bore 81d through the radial bores 81e to the axial fluid flow passages 97 during compression of the suspension fork 12. Thus, the center bore 81d and the radial bores 81e form a center compression fluid passage connecting the lower internal chamber 94 to the upper internal chamber 93. The damping force adjustment valve 89 is disposed in the center bore 81d of the lockout valve 81 for regulating the flow rate of the fluid flowing from the center bore 81d through the radial bores 81e to the axial fluid flow passages 97. Basically, the lower tip end of the damping force adjustment valve 89 cooperates with the center bore 81d of the lockout valve 81 to form a needle valve. In particular, the damping force adjustment valve 89 is axially movable within the center bore 81d of the lockout valve 81 such that the tip end of the damping force adjustment valve 89 selectively change the flow area between the center bore 81d and the tip end of the damping force adjustment valve 89.

The upper shaft portion 81b of the lockout valve 81 has internal threads within the center bore 81d of the lockout valve 81 for securing the second actuating member 92 thereto as explained below. Thus, rotation of the second actuating member 92 causes the lockout valve 81 to also rotate therewith.

The lower shaft portion 81c of the lockout valve 81 supports the damping piston 80 together with the check valve 95 and the shim stack valve 96. In particular, the lower end of the lower shaft portion 81c of the lockout valve 81 has an external thread for threadedly receiving a nut 98.

The lockout piston 82 basically includes a piston portion 82a and a shaft portion 82b. The piston portion 82a has an annular seal or O-ring disposed between its outer peripheral surface and the internal surface of the upper tube 36 to create a seal therebetween. The piston portion 82a preferably includes a plurality (three) of main fluid flow ports 82c, a plurality (six) of blow ports 82d and a plurality (eighteen) of return ports 82e. The main fluid flow ports 82c are arranged in a circumferential manner around the piston portion 82a with each of the areas of between the main fluid flow ports 82c including two of the blow ports 82d. The main fluid flow ports 82c are axially arranged and extend between the upper and lower axial end faces of the piston portion 82a. The blow ports 82d extend at an angle with respect to the center axis of the lockout piston 82 so that the blow ports 82d extend between the upper and lower axial end faces of the piston portion 82a. The return ports 82e are arranged in three groups of six ports with one of the groups of the return ports 82e being located radially outward of a corresponding one of the main fluid flow ports 82c. The return ports 82e extend at an angle with respect to the center axis of the lockout piston 82 so that the return ports 82e extend between the lower axial end face of the piston portion 82a and one of the main fluid flow ports 82c.

As mentioned above, the lockout valve 81 prevents fluid flowing through the damping piston 80 when in a lockout mode. However, when the lockout valve 81 is in the non-lockout mode, the axial fluid flow passages 97 fluid flow ports of the damping piston 80 are axially aligned with the fluid flow ports 82c of the lockout valve 81. The flow direction of the fluid through the damping piston 80, the lockout valve 81 and the lockout piston 82 during compression of the right leg 26 is primarily axially upward when the damping lockout mechanism is in a non-lockout mode. Thus, the direction of the flow direction of the fluid through the damping piston 80, the lockout valve 81 and the lockout piston 82 does not reverse its axial direction. Likewise, the flow direction of the fluid through the damping piston 80, the lockout valve 81 and the lockout piston 82 does not extend in a primarily radial direction at any point through the damping piston 80, the lockout valve 81 and the lockout piston 82. Such a substantially linear (axial) flow path of the fluid through the damping piston 80, the lockout valve 81 and the lockout piston 82 effectively prevent unnecessary damping effect from occurring at the flow path through the damping piston 80, the lockout valve 81 and the lockout piston 82.

The return valve 83 is disposed between the main body portion 81a of the lockout valve 81 and the piston portion 82a of the lockout piston 82. The return valve 83 normally closes off the return ports 82e of the lockout piston 82 so that fluid does not normally flow through the return ports 82e of the lockout piston 82. The return valve 83 basically includes a return valve plate 83a and a compression spring 83b. The return valve plate 83a is pressed against the lower end of the lockout piston 82 by the compression spring 83b to normal close off the return ports 82e. However, during rebound of the suspension fork 12 when in the lockout mode, the fluid in the right leg 26 forces the return valve plate 83a away from the lower end of the lockout piston 82 to open the return ports 82e to allow the fluid to flow therethrough. Thus, the return valve 83 selectively allows fluid communication between the upper internal chamber 93 and the lower internal chamber 94 through the return ports 82e during rebound. Thus, the return ports 82e act to bypass the lockout piston 82 when in rebound of the suspension fork 12 occurs while in the lockout mode.

The blow-off mechanism 84 is normally pressed against the upper end of the lockout piston 82 to normal close off the blow ports 82d. The blow-off mechanism 84 basically includes a blow-off valve plate 84a, an abutment plate 84b and a compression spring 84c disposed between the blow-off valve plate 84a and the abutment plate 84b. The blow-off mechanism 84 selectively allows fluid communication between the upper internal chamber 93 and the lower internal chamber 94 through the blow ports 82d. During the normal operating mode of the suspension fork 12, the blow-off mechanism 84 is engaged with the upper surface of the lockout piston 82 to prevent fluid from flowing through the blow-off mechanism 84. When in the lockout mode if the suspension fork 12 is subjected to a certain large force above a prescribed threshold, the blow-off mechanism 84 acts as a safety valve to allow the suspension fork 12 to compress. In response to such a large force on the suspension fork 12 when in the lockout mode, a sufficient force of fluid pressure acting on the blow-off mechanism 84 from the lower internal chamber 94 will open the blow ports 82d to allow fluid flow through the blow ports 82d into the upper internal chamber 93.

The shaft portion 82b of the lockout piston 82 is integrally formed with the piston portion 82a of the lockout piston 82 as a one-piece, unitary member. The upper end of the shaft portion 82b of the lockout piston 82 is threaded to the upper support member 87 so that the lockout piston 82 remains stationary with respect to the upper tube 36.

The free piston 85 is axially slidable on the shaft portion 82b of the lockout piston 82. However, the free piston 85 is normally held by the fluid pressure within the upper tube 36 against the compression spring 86. When the suspension fork 12 is being compressed, the fluid pressure in the upper internal chamber 93 of the upper tube 36 increases to compress the compression spring 86 such that the area of the upper internal chamber 93 increases in area. During rebound, the fluid pressure in the upper internal chamber 93 of the upper tube 36 decreases and the compression spring 86 moves the free piston 85 back to its normal rest position. The free piston 85 has an annular seal or O-ring disposed between its outer peripheral surface and the internal surface of the upper tube 36 to create a seal therebetween. Also the free piston 85 has an inner sealing arrangement between its inner peripheral surface and the outer surface of the shaft portion 82b of the lockout piston 82 to create a seal therebetween. Thus, the uppermost space of the upper tube 36 above the free piston 85 is isolated from the upper internal chamber 93 of the upper tube 36

The upper support member 87 has a stepped center bore with a lower bore portion 87a with an internal thread, a middle bore portion 87b with an annular seal or O-ring and an upper bore portion 87c with a larger diameter than the other portions 87a and 87b. The upper support member 87 is threaded into the upper body member 88 so as to be fixed to the upper end of the upper tube 36. An annular seal or O-ring is disposed between its outer peripheral surface and the internal surface of the upper body member 88 to create a seal therebetween. Also the annular seal or O-ring is disposed between its outer peripheral surface and the internal surface of the upper body member 88 to create a seal therebetween. The upper end of the shaft portion 82b of the lockout piston 82 is threaded into the lower bore portion 87a of the upper support member 87 so as to be fixed to the upper end of the upper tube 36. The upper bore portion 87c of the upper support member 87 rotatably supports a part of the second actuating member 92 as discussed below.

The upper body member 88 is threaded into the upper end of the upper tube 36 with an annular seal or O-ring disposed between its outer peripheral surface and the internal surface of the upper tube 36 to create a seal therebetween. The upper body member 88 has a stepped center bore with a lower bore portion 88a with an internal thread, a middle bore portion 88b with an internal thread and an upper bore portion 88c with a plurality of indexing recesses. The upper body member 88 also has an annular recess 88d in its upper surface with the annular recess 88d coaxially surrounding the upper bore portion 88c. Two curved slots 88e are formed in the upper body member 88 so that the lower bore portion 88a communicates with the annular recess 88d. The curved slots 88e are arc shaped slots with their center points being located on the center axis of the stepped center bore of the upper body member 88. The upper bore portion 88c and the annular recess 88d form an upper shaft portion 88f with an external thread that threadedly receives the first actuating member 91 thereon.

The damping force adjustment valve 89 has its upper end coupled to the first actuating member 91 so that operation of the first actuating member 91 causes the damping force adjustment valve 89 to move in an axial direction. In particular, the upper end of the damping force adjustment valve 89 has an external thread that is threadedly engaged with the internal thread of the middle bore portion 88b of the upper body member 88. When the first actuating member 91 is rotated, the damping force adjustment valve 89 is also rotated, but the damping force adjustment valve 89 also moves in an axial direction due to the engagement of the external thread of the internal thread of the middle bore portion 88b of the upper body member 88. This axial movement of the damping force adjustment valve 89 selectively adjusts a fluid flow rate of fluid from the lower internal chamber 93 to the upper internal chamber 94. Basically, the lower tip end of the damping force adjustment valve 89 cooperates with the center bore 81d of the lockout valve 81 to form a needle valve.

In the illustrated embodiment, the first and second actuating members 91 and 92 are independently operable such that the damping force adjustment valve 89 remains in a set position when the second actuating member 92 is being operated between a lockout position corresponding to a non-damping or lockout mode and an unlocked position corresponding to a normal damping or operating mode. Also in the illustrated embodiment, the first and second actuating members 91 and 92 are both rotatably mounted to the upper body member 88 about a common center axis of the right leg 26. The first actuating member 91 is disposed within the second actuating member 92 so that the second actuating member 92 rotates around the first actuating member 91.

Preferably, the first actuating member 91 has a knob portion 91a, a shaft portion 91b, a spring 91c, a ball detent 91d and an internally threaded cap 91e. The spring 91c and the ball detent 91d are located in a radially extending bore of the shaft portion 91b so that the ball detent 91d is urged against an annular inner surface of the upper body member 88. The inner surface of the upper body member 88 has a plurality of recesses 88g (only two shown) that are selectively engaged by the ball detent 91b to provide individual adjustment points for controlling the damping rate of the upper damping control unit 72. Thus, an indexing arrangement formed by the shaft portion 91b, the spring 91c, the ball detent 91d and the recesses 88a. The shaft portion 91b of the first actuating member 91 has a lower end with a non-circular cross section that is disposed in a non-circular bore in the upper end of the damping force adjustment valve 89. The knob portion 91a is fixedly mounted to an upper end of the shaft portion 91b of the first actuating member 91 by a set screw or pin. Thus, rotation of the first actuating member 91 causes the damping force adjustment valve 89 to rotate therewith. The internally threaded cap 91e is threaded onto the upper body member 88. When the internally threaded cap 91e is threaded onto the upper body member 88, the shaft portion 91b of the first actuating member 91 is prevented from moving upwardly such that the lower end of the shaft portion 91b remains in the non-circular bore in the upper end of the damping force adjustment valve 89. Since the knob portion 91a is fixedly mounted to an upper end of the shaft portion 91b, the internally threaded cap 91e also acts to retain the knob portion 91a of the first actuating member 91 to the damping force adjustment valve 89.

Preferably, the second actuating member 92 has a knob portion 92a and a control rod 92b. The knob portion 92a and the control rod 92b are connected together by a plurality of pins 92c so that the knob portion 92a and the control rod 92b rotate together as a unit.

As seen in FIG. 3, the lower damping unit 74 basically includes a damping piston 110, a connecting rod 112, a sealing member 114 and a damping force adjustment valve 116. The lower damping unit 74 becomes immovable in the lockout mode because the free piston 85 becomes immovable in response to a lock-out operation (i.e. because the damping fluid no longer flows in the lock-out mode). The lower damping unit 74 can be any type of damping mechanism as need and/or desired. Thus, the lower damping unit 74 will not be described or illustrated in detail.

Basically, the damping piston 110 is stationary with respect to the lower tube 38 and slidably contacts the internal surface of the upper tube 36. The damping piston 110 has axially extending fluid flow ports to provide a damping effect. The connecting rod 112 is a hollow rod that fixedly attaches the damping piston 110 to the bottom end of the lower tube 38. The hollow interior of the connecting rod 112 is sealed at its upper and lower ends to form an air tight chamber. The sealing member 114 forms a seal between the upper end of the connecting rod 112 and the internal surface of the upper tube 36. The sealing member 114 is stationary with respect to the lower tube 38 and slidably contacts the internal surface of the upper tube 36. The damping force adjustment valve 116 is disposed in the upper end of the connecting rod 112 to regulate the fluid flow rate passing from above the damping piston 110 to the lowermost space below the damping piston 110. The lower damping control unit 76 is configured and arranged to move the damping force adjustment valve 116 in an axial direction to regulate the fluid flow rate.

SECOND EMBODIMENT

Figure 12:
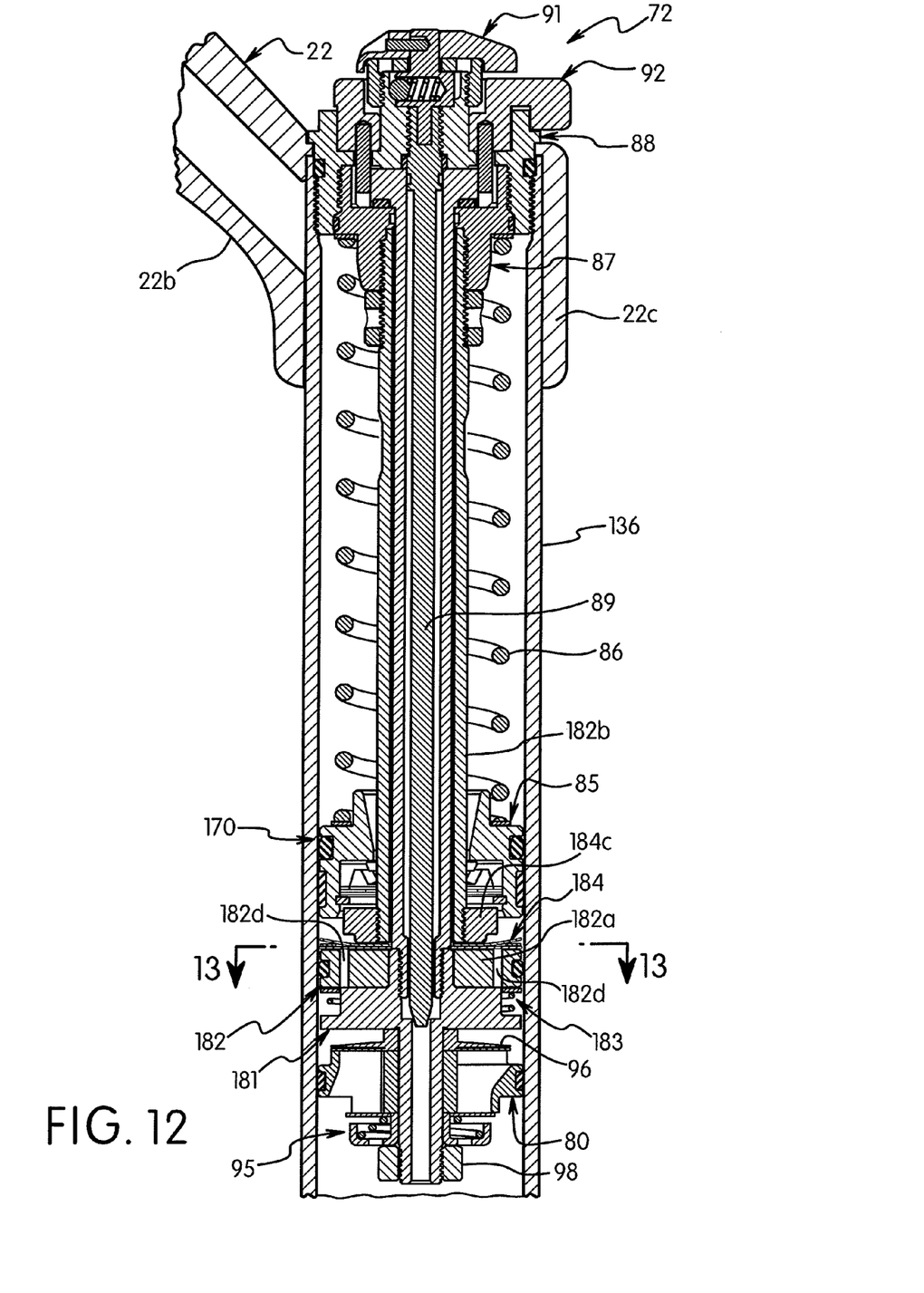
FIG. 12 is an enlarged, longitudinal cross sectional view of a top portion of a front suspension fork in accordance with an alternate embodiment.
Figure 13:
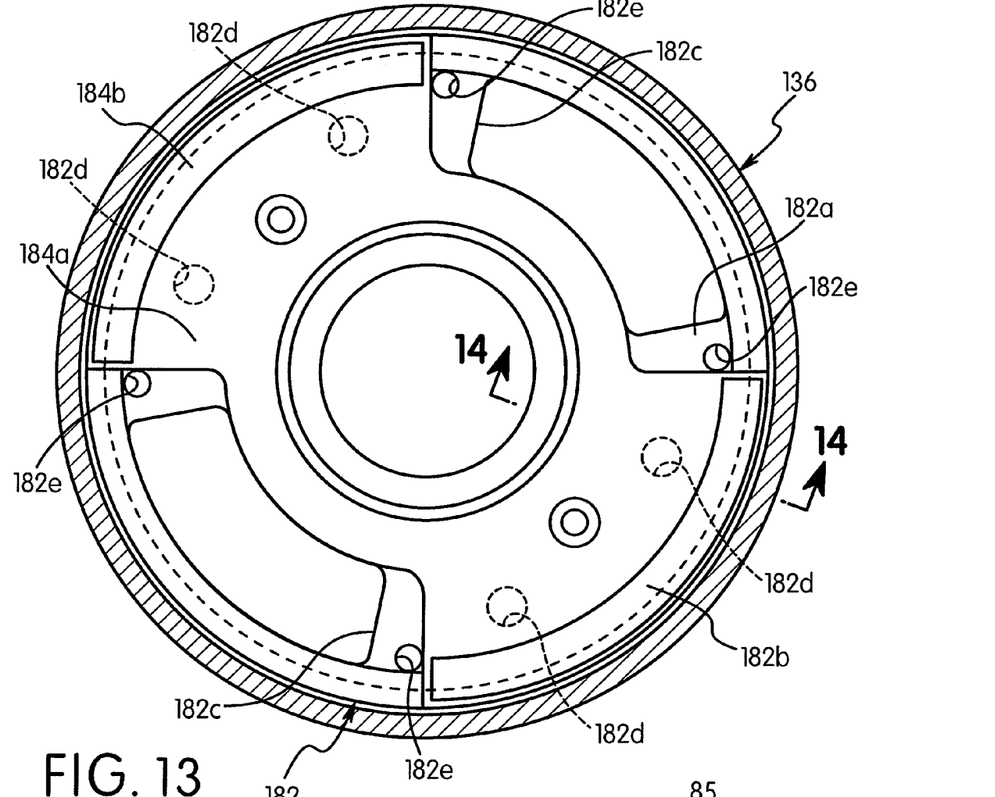
FIG. 13 is a transverse cross sectional view of the blow off valve as seen along section line 13-13 of FIG. 12 in accordance with the alternate embodiment.
Figure 14:
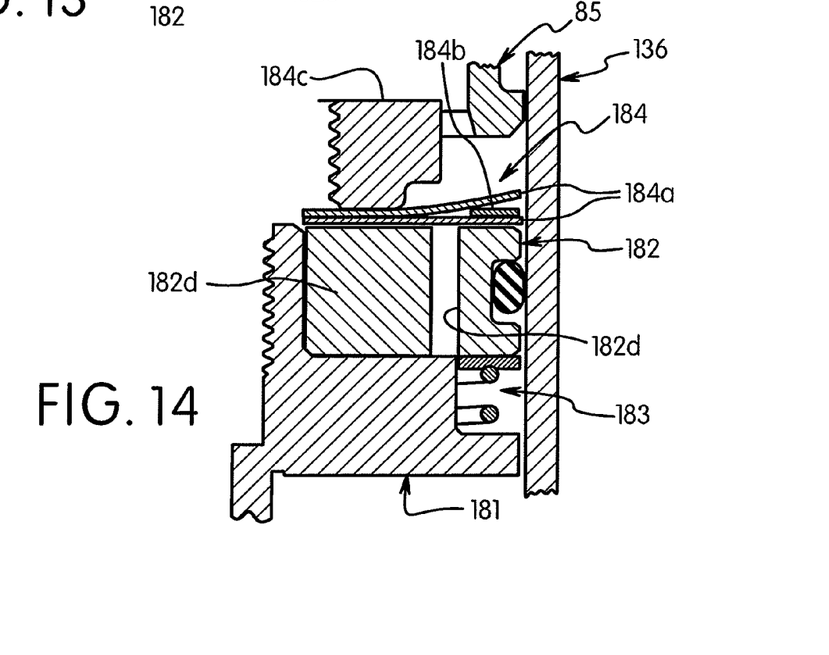
FIG. 14 is an enlarged, partial cross sectional view of a portion of the blow off valve as seen along section line 14-14 of FIG. 13 in accordance with the alternate embodiment.

Referring now to FIGS. 12 to 14, a right leg 126 in accordance with a second embodiment will now be explained. The right leg 126 is used with the suspension fork 12 by substituting replaces right leg 26, discussed above, with the right leg 126. The right leg 126 is identical to the right leg 26 of the suspension fork 12, except that a modified upper damping unit 170 is used in the right leg 126. Thus, the upper damping control unit 72 of the first embodiment is used to regulate the damping force of the modified upper damping unit 170 and to lockout the modified upper damping unit 170 in the same manner as the first embodiment. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The parts of the upper damping unit 170 that are different form the upper damping unit 70 includes a modified lockout valve 181, a modified lockout piston 182, a modified return valve 183 and a modified blow-off valve 184. In this embodiment, the upper damping unit 170 is axially shorter than the upper damping unit 70 because the modified blow-off valve 184 uses a shim stack that includes a pair of blow-off valve shims 184a with a pair of arc shaped preset valve members 184b disposed between the blow-off valve shims 184a (instead of a coil spring in a conventional blow-off valve). A nut 184c holds the blow-off valve shims 184a and the preset valve members 184b in place against the modified lockout piston 182. The preset valve members 184b are configured and arranged to change amount of fluid pressure needed to flex the blow-off valve shims 184a so as to allow fluid to flow through the modified lockout piston 182. In particular, the preset valve members 184b elastically deform the upper one of the blow-off valve shims 184a. Because of the use of the modified blow-off valve 184, minor changes were also made to the modified lockout valve 181, the modified lockout piston 182 and the modified return valve 183 with respect to the first embodiment.

The modified lockout valve 181 and the modified lockout piston 182 are essentially the same as the lockout valve 81 and the modified lockout piston 82, except that the number and arrangements of the ports and passages has changed to accommodate the modified blow-off valve 184. For example, as seen in FIG. 13, the modified lockout piston 182 has only two fluid flow passages. However, the overall function and operation of the upper damping unit 170 is the same as the upper damping unit 70, as discussed above.

As seen in FIGS. 12 to 14, the modified lockout piston 182 is essentially the same as the lockout piston 82, except that the modified lockout piston 182 is a two piece structure and only uses a pair of two fluid flow passages. In particular, the modified lockout piston 182 basically includes a piston portion 182a and a shaft portion 182b that is separate from the piston portion 182a. The piston portion 82a has an annular seal or O-ring disposed between its outer peripheral surface and the internal surface of the upper tube 136 to create a seal therebetween. The piston portion 182a preferably includes two main fluid flow ports 182c, a plurality (four) of blow ports 82d and a plurality (four) of return ports 182e. The main fluid flow ports 182c are axially arranged and extend between the upper and lower axial end faces of the piston portion 182a.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the above embodiment(s), the following directional terms "forward", "rearward", "above", "downward", "vertical", "horizontal", "below" and "transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle suspension system comprising:

an upper tube including a top portion and a bottom portion;

a lower tube including a top portion and a bottom portion, with the bottom portion of the lower tube being telescopically mounted with respect to the top portion of the upper tube to form an internal area of the upper and lower tubes;

a damping unit disposed within the internal area of the upper and lower tubes, the damping unit including a damping piston defining an upper internal chamber and a lower internal chamber, a damping force adjustment valve which selectively adjusts a fluid flow rate of fluid passed the damping piston, and a damping lockout mechanism axially arranged with respect to the damping piston to selectively prevent fluid flowing through the damping piston, the damping piston having a fluid flow port that is axially spaced with respect to a fluid flow passage of the damping lockout mechanism such that an axial compression flow path is formed in an axial direction of the internal area by the fluid flow port of the damping piston and the fluid flow passage of the damping lockout mechanism when the damping lockout mechanism is in a non-lockout mode; and a damping control unit including a first actuating member operatively coupled to the damping force adjustment valve and a second actuating member operatively coupled to the damping lockout mechanism, the first and second actuating members being independently operable such that the damping force adjustment valve remains in a set position when the second actuating member is being operated.

2. The bicycle suspension system according to claim 1, wherein the internal area by the fluid flow port of the damping piston and the fluid flow passage of the damping lockout mechanism are axially aligned when the damping lockout mechanism is in the non-lockout mode.

3. The bicycle suspension system according to claim 1, wherein the first and second actuating members are rotatably disposed at the top portion of the upper tube.

4. The bicycle suspension system according to claim 1, wherein the first and second actuating members are rotatable about a common rotational axis.

5. The bicycle suspension system according to claim 1, wherein the damping lockout mechanism includes a lockout piston disposed in one of the upper and lower tubes and a lockout valve rotatable by the second actuating member about an axis extending in the axial direction of the internal area to block the fluid flow passage in the lockout piston when the second actuating member is in a lockout position and to expose the fluid flow passage in the lockout piston when the second actuating member is in a non-lockout position.

6. The bicycle suspension system according to claim 1, wherein the damping force adjustment valve is movable in the axial direction by the first actuating member to adjust a fluid flow rate through a compression fluid passage connecting the lower internal chamber to the upper internal chamber.

7. The bicycle suspension system according to claim 6, wherein the damping lockout mechanism includes a lockout piston disposed in one of the upper and lower tubes and a lockout valve rotatable by the second actuating member about an axis extending in the axial direction of the internal area to block the fluid flow passage in the lockout piston when the second actuating member is in a lockout position and to expose the fluid flow passage in the lockout piston when the second actuating member is in a non-lockout position.

8. The bicycle suspension system according to claim 1, wherein the damping piston and the damping lockout mechanism are both disposed in the upper tube and are both non-axially movable with respect to the upper tube.

9. The bicycle suspension system according to claim 1, wherein the damping lockout mechanism includes a lockout piston disposed in sealing engagement with the upper tube and a lockout valve rotatable by the second actuating member about an axis extending in the axial direction of the internal area to block the fluid flow passage in the lockout piston when the second actuating member in a lockout position and to expose the fluid flow passage in the lockout piston when the second actuating member in a non-lockout position.

10. The bicycle suspension system according to claim 1, wherein the damping lockout mechanism includes a lockout piston disposed in sealing engagement with one of the upper and lower tubes and a lockout valve movable by the second actuating member to block the fluid flow passage in the lockout piston when the second actuating member in a lockout position and to expose the fluid flow passage in the lockout piston when the second actuating member in a non-lockout position.

11. The bicycle suspension system according to claim 10, wherein the damping lockout mechanism includes a blow-out mechanism that is arranged to open a blow-out port in the lockout piston when a prescribed fluid pressure occurs while the damping lockout mechanism is in a lockout mode.

12. The bicycle suspension system according to claim 11, wherein the lockout valve is movable to block a first end of the blow-out port in the lockout piston when the damping lockout mechanism is in the non-lockout mode and to expose the first end of the blow-out port when the damping lockout mechanism is in the lockout mode.

13. The bicycle suspension system according to claim 10, wherein the lockout valve includes a center compression fluid passage extending in an axial direction of the internal area with a tip end of the damping force adjustment valve being movable in an axial direction to adjust the fluid flow rate through the center compression fluid passage.

14. The bicycle suspension system according to claim 13, wherein the lockout valve includes at least one radial compression fluid passage extending in a radial direction of the internal area with the radial compression fluid passage and the center compression fluid passage fluidly intersecting with each other; and the tip end of the damping force adjustment valve is movable to adjust the fluid flow rate from the center compression fluid passage to the radial compression fluid passage.

15. The bicycle suspension system according to claim 1, wherein the damping unit includes a compression spring disposed within one of the upper and lower tubes and a free piston movable in the axial direction of the internal area with the compression spring biasing the free piston towards the damping piston.

16. The bicycle suspension system according to claim 15, wherein the damping lockout mechanism is disposed between the free piston and the damping piston.

* * * * *